US005281467A

United States Patent [19]

Shimada et al.

[11] Patent Number: 5,281,467

[45] Date of Patent: Jan. 25, 1994

[54] INK JET RECORDING PAPER

[75] Inventors: Teruhisa Shimada; Hirokazu Hirata; Yoshifumi Iimori, all of Tokyo, Japan

[73] Assignee: Sanyo-Kokusaku Pulp Co., Ltd., Tokyo, Japan

[21] Appl. No.: 935,329

[22] Filed: Aug. 26, 1992

[30] Foreign Application Priority Data

Aug. 27, 1991 [JP] Japan ................................ 3-240518

[51] Int. Cl.[5] ................................................ B32B 9/00

[52] U.S. Cl. .................................... 428/195; 428/206; 428/331; 428/402; 428/688; 428/913; 346/135.1

[58] Field of Search ............ 428/342, 195, 323, 321.3, 428/207, 423.1, 206, 331, 402, 688; 346/135.1

[56] References Cited

U.S. PATENT DOCUMENTS

| | | | |
|---|---|---|---|
| 4,910,084 | 3/1990 | Yamasaki et al. | 428/195 |
| 5,165,973 | 11/1992 | Kojima et al. | 428/195 |
| 5,180,624 | 1/1993 | Kojima et al. | 428/537.5 |
| 5,185,213 | 2/1993 | Fujita et al. | 428/195 |

*Primary Examiner*—Patrick J. Ryan
*Assistant Examiner*—William A. Krynski
*Attorney, Agent, or Firm*—Millen, White, Zelano, & Branigan

[57] ABSTRACT

An ink jet recording paper having a support provided on at least one surface with a pigment-containing coating in accordance with a cast coating method, with said pigment comprising at least 50 weight percent of a calcium carbonate-compounded silica, whereby achieving excellent ink absorption, smoothness, gloss and water resistance together with an excellent dot density, sharpness and roundness to ensure recording of high quality, high contrast full color images.

14 Claims, No Drawings

INK JET RECORDING PAPER

FIELD OF THE INVENTION

This invention relates to an ink jet recording paper, and in particular, to an ink jet recording paper suitable for forming high definition, full color images.

BACKGROUND OF THE INVENTION

Ink jet recording is an image recording technique wherein small ink droplets are expelled and made to adhere to a recording paper so as to form dots. In ink jet recording there is little noise, full color images are easily obtained, and as no developing or fixing is required, recordings can be made at high speed. In recent years, the technique has been attracting considerable attention due to its ability to make perfect copies of color images displayed on a cathode ray tube or other device, or of diagrams and color originals (i.e. its ability to produce hard copies), and it is therefore rapidly coming into general use. In line with the diversification of needs, however, there has been a notable increase in the demand for larger image sizes, higher speeds and higher definition of the recorded image.

From the viewpoint of the aforesaid needs, an ink jet recording paper (referred to hereafter simply as recording paper) is required to have the following properties.

(1) Ink adhering to the recording paper is absorbed without running, and absorbed ink does not smudge.

(2) Ink dots formed on the paper have high contrast, and a bright color tone.

(3) Ink dots are suitably distributed in the direction of the paper surface, the dots being almost round with sharp edges.

(4) The paper has excellent smoothness and gloss so that clear, bright recorded images are obtained.

(5) Recorded images are water-resistant (i.e. if the recorded image on the paper surface gets wet, the ink dots forming the image do not smudge and their color does not run).

To resolve the aforesaid problem (1), non-colloidal silica powders having high ink absorption were incorporated in the coating on the paper (e.g. Japanese Tokkai Sho 55-51583). In this case however, although the ink absorption of the recording paper was improved, its smoothness, gloss and water resistance were inadequate.

To improve the smoothness and gloss of the recording paper, a super calender or gloss calender was applied to the paper surface (e.g. Tokkai Sho 57-167879); alternatively, a thermoplastic resin or particles of same were incorporated in the paper, heat and pressure being applied to the paper after printing so as to dissolve the resin; or again, the paper surface was treated with a plasticizer capable of swelling and/or an organic solvent (e.g. Tokkai Sho 53-50744, Tokkai Sho 59-196285, Tokkai Sho 59-201891, Tokkai Sho 59-204591, Tokkai Sho 59-204592 and Tokkai Sho 59-222381).

These methods succeeded in improving the smoothness and gloss of the recording paper, but its ink absorption properties deteriorated. In particular, in the aforesaid method of incorporating a thermoplastic resin in the recording paper, the treatment of the paper after recording was tedious so that high speed was difficult to achieve, and in addition the manufacturing cost of recording equipment was increased.

To increase the water resistance of recorded images, some proposals mention the incorporation of a basic oligomer in the paper (e.g. Tokkai Sho 60-11389).

This technique does improve water resistance, but a considerable amount of water adheres to the paper when the basic oligomer is coated. The paper therefore becomes creased and wrinkled, and the appearance of the recorded image deteriorates.

To improve ink absorption, smoothness, gloss and water resistance properties of the recording paper, methods of manufacturing ink jet recording paper involving preparation of a cast coated paper have been proposed (e.g. Tokkai Sho 61-209189, Tokkai Sho 62-95285, Tokkai Sho 63-211394, Tokkai Sho 63-264391, Tokkai Sho 63-265680 and Tokkai Hei 1-95214), and good results have been obtained. However, even in those cases, the density, sharpness and roundness of each dot were still not good enough to obtain high quality, high contrast, full color recorded images.

SUMMARY OF THE INVENTION

After extensive studies aimed at resolving the aforesaid problems, it has been found that satisfactory results were obtained by the use of a predetermined amount of a calcium carbonate-compounded silica (or silica crystallized on the individual surfaces of needle crystals of calcium carbonate) as a pigment in conjunction with other pigments in a coating formed by a cast coating method on the surface of a support, thereby achieving the present invention.

It is therefore an object of the invention to provide an ink jet recording paper having excellent ink absorption, smoothness., gloss and water resistance together with an excellent dot density, sharpness and roundness, and which is therefore suitable for the recording of high quality, high contrast full color images.

The aforesaid objects of the invention are attained by an ink jet recording paper having a support provided on at least one surface with a pigment-containing coating in accordance with a cast coating method, characterized in that said pigment contains at least 50 weight percent of a calcium carbonate-compounded silica.

In accordance with an embodiment of the present invention, the ink jet recording paper comprises a pigment containing a predetermined quantity of a calcium carbonate-compound silica in a coating applied to the surface of a support and subjected to a surface treatment according to a cast coating method, whereby achieving excellent ink absorption, smoothness, gloss and water resistance. Therefore, the ink jet recording paper of the present invention is highly suitable for recording high quality, high contrast color images.

DETAILED DESCRIPTION OF THE INVENTION

A calcium carbonate-compounded silica [$CaCO_3.nSiO_z$] according to the present invention (which is abbreviated as "a compound silica", hereinafter) can easily be obtained by reacting a sodium silicate [$Na_2O.nSiO_z$] with calcium chloride [$CaCl_2$] so as to produce a calcium silicate [$Cao.nSiO_z$] and blowing carbon dioxide [$CO_z$] therethrough.

The proportion of calcium carbonate to be compounded with silica can be controlled by adjusting the amount of calcium chloride added, however in the present invention it is particularly preferable to use a compound silica in which calcium carbonate is introduced in a proportion of 15–25 mole % based on CaO.

In this invention, the average particle size of the compound silica used should be as small as possible in order to increase dot sharpness and density. This particle size is therefore preferably no greater than 4 μm and more preferably no greater than 3 μm.

The particle size referred to here is the average particle size of second order particle agglomerates of the compound silica. More specifically, it is the average particle size as measured by a Coulter Counter Particle Distribution Meter.

In this invention, the dot density tends to increase the smaller is the specific surface area of the calcium carbonate-compounded silica. To obtain a good recorded image with high contrast, therefore, it is preferable that the specific surface area of the compound silica as measured by the BET method is no greater than 100 $m^2/g$, and more preferable that it is no greater than 80 $m^2/g$.

In this invention, it is necessary that the content of the aforesaid calcium carbonate-compounded silica in the pigment which is incorporated in the coating is no less than 50 weight %, but preferable that this content is no less than 80 weight %.

As the content of the aforesaid compound silica is increased, the dot density increases., sharpness improves and the dots become more perfectly round, so that an excellent recorded image is obtained. When that content is less than 50 weight %, on the other hand, the dot density is not sufficiently high and the reproducibility of the colors in the original image may deteriorate.

In this invention, there is no specific limitation on pigments used in conjunction with the aforesaid calcium carbonate-compounded silica, and they are chosen from those commonly used in paper coatings.

Such pigments include, for example, inorganic ones such as synthetic silica, kaolin, talc, calcium carbonate, aluminum hydroxide, titanium dioxide or titanium white, and organic ones such as a plastic pigment. Of these pigments, synthetic silica is particularly preferable.

When synthetic silica is used together, ink absorption is improved by using a synthetic silica of a large specific surface area, while dot density is increased by using a synthetic silica of a small specific surface area.

The aforesaid pigments may easily be incorporated in the coating by any of the methods known in the art, the pigments being mixed and dispersed in a coating composition.

In this invention, a binder is added to the coating composition in order to improve adhesion of the pigment of this invention to the support and render the coating uniform.

Such a binder may typically be a starch such as oxidized starch or esterified starch, a cellulose derivative such as carboxymethyl cellulose or hydroxyethyl cellulose, polyvinylalcohol or its derivatives, casein, gelatin, soybean protein, styrene-maleic acid resin or its derivatives, styrene-butadiene latex, a vinyl acetate emulsion, or a mixture of two or more of these substances.

The amount of a binder used is normally 20–80 parts by weight per 100 parts by weight of the pigment, but said amount can be adjusted properly according to the type and quantity of the pigment used.

If necessary, a pigment dispersant, water retention agent, thickener, anti-foaming agent, mold release agent, preservative, color pigment, waterproofing agent, penetrant, fluorescent dye or ultraviolet absorption agent may also be added to the coating composition.

In this invention, it is desirable that the coating contains a cationic polymer to improve the water resistance of the recorded image.

Such cationic polyelectrolytes react with $-SO_3Na$, $-SO_3H$, $-NH_2$ or like group in water-soluble direct or acidic dye molecules in the ink so as to form water-insoluble salts. This prevents the dye in the ink from dissolving in water, and improves the water resistance of the recorded image.

Such cationic polyelectrolyte include, for example, polyvinylbenzyltrimethylammonium halides, polydiacryldimethylammonium halides, poly dimethylaminoethylmethacrylate hydrochloride, polyethyleneimine, dicyanodiamide-formaldehyde condensates, epichlorohydrin-modified polyalkylamines, polyvinylpyridinium halides, polyethyleneimine quaternary ammonium salts, or polyamines.

The coating composition prepared as described hereintofore may be applied to the support using any of means known in the art such as a roller, air knife, blade, curtain, bar, gravure, comma or like coater. The amount of the composition applied is normally 5–50 $g/m^2$ on a solids basis per one side of the support, but is preferably 10–30 $g/m^2$. The amount of the pigment therein is preferably 3–30 $g/m^2$.

In this invention, the composition applied to the support is processed in accordance with a cast coating method.

A cast coating method described above is the same as that normally used to manufacture cast coated paper.

More specifically, in this invention, the coating may be provided according to a wet cast coating method wherein a heated drum having a mirror-polished cylindrical outer surface is brought into pressure contact with a wet coating on the surface of a support so as to give the support surface a gloss finish; a gel cast coating method wherein the wet coating on the support surface is first gelated, and a heated drum having a mirror-polished cylindrical outer surface is brought into pressure contact with it so as to give the support surface a gloss finish; or a re-wet coating method wherein the wet coating on the support surface is first dried, re-wetted with a wetting solution to plasticize it, and a heated drum having a mirror-polished cylindrical outer surface is brought into pressure contact with it so as to give the support surface a gloss finish.

There is no particular limitation concerning the support used in the invention, this support being suitably chosen from any of those known in the art such as neutral paper having wood pulp as its main constituent which is normally used for ink jet recording paper.

EXAMPLES

The invention will now be described in more detail by means of the following examples, but it should be understood that it is not to be limited in any way by them.

Hereinafter, the term "parts" which indicates added quantities and the term "%" which indicates contents refer respectively to "parts by weight" and "weight %".

EXAMPLE 1

100 parts of a calcium carbonate-compounded silica of specific surface area 60 $m^2/g$ and average particle size 2.8 μm (FINESIL CM-F, TOKUYAMA SODA K.K.) and 20 parts colloidal silica (SNOWTEX N, NISSAN KAGAKU K.K.) as pigments, 30 parts styrene-butadiene latex (JSR-0801, NIHON GOSEI GOMU K.K.) and 30 parts casein (lactic casein, product of New Zealand) as binders, and 2 parts calcium stearate (NOPCOAT C-104, SUN NOPCO K.K.) as a mold release agent, were blended together to give a coating composition having a 30% solids content.

The coating composition thus obtained was applied at a coverage of 17 $g/m^2$ on a solids basis by means of a roller coater to form a coating on paper having a basis weight of 90 $g/m^2$. The paper provided with this coating (referred to hereafter as the coated paper) was then treated with a 10% aqueous solution of calcium formate as a coagulant, and an aqueous solution containing 3% of a polyethyleneimirie quaternary ammonium salt, which is a cationic polyelectrolyte, as a waterproofing agent.

Next, the mirror surface of a cast drum heated to 100° C. as brought into pressure contact with the coated surface while the coating on the coated paper was still wet, and the coating was dried so as to obtain an ink jet recording paper according to this invention.

The following physical properties of the recording paper obtained were measured, and the suitability of the paper for ink jet recording was evaluated. Table 2 shows the results.

(1) Physical Properties of Recording Paper 1) 75° Mirror Surface Gloss

Gloss was measured according to the method described in JIS-Z8741 using a Gloss Meter GM26D (MURAKAMI SHIKISAI K.K.).

2) Smoothness

Smoothness was measured using an Ohken Type Smoothness Tester (a simplified model of Bekk smoothness tester, made by ASAHI SEIKO K.K.).

(2) Recording Suitability of Ink Jet Recording Paper

1) Ink Absorption

Characters were printed in color ink one over another, the solid printed part was rubbed with the finger and the degree of tailing of the ink was judged visually.

The following standards were used for the evaluation.

| | | | |
|---|---|---|---|
| ⊚: | very satisfactory | ○: | satisfactory |
| Δ: | rather unsatisfactory | X: | unsatisfactory |

2) Dot Density

The reflection density was measured at 5 points using a Konica Microdensity Meter PDM-5 (KONICA K.K.), and the average value of the density at these 5 points was taken as the dot density.

3) Dot Sharpness

The smudging of the edge of the dot was observed and evaluated using a stereomicroscope. The following standards were used for the evaluation:

| | | | |
|---|---|---|---|
| ○: | satisfactory | Δ: | somewhat smudgy |
| X: | smudgy and unsatisfactory | | |

4) Dot Diameter and Roundness

The average value of circle corresponding diameters of 16 dots was measured by an image analyzer (ADS K.K.), and taken as the dot diameter. The roundness coefficient of the 16 dots was also calculated from the equation below, and its average value was taken as the dot roundness.

The nearer the roundness coefficient is to 1, the rounder the dot.

$$\text{Roundness coefficient} = (\text{area} \times 4 \times \pi)/P^2$$

where P is the length of the dot circumference and area is the area of the dot.

The dots were formed by a continuous color ink jet printer using commercial water-soluble inks such as cyan, magenta, yellow and black. Dot density, dot diameter and roundness coefficient are values for cyan ink. Desirable target values are dot density no less than 0.80, dot diameter 60–70 μm, and roundness coefficient no less than 0.70.

EXAMPLE 2

60 parts of a calcium carbonate-compounded silica of specific surface area 80 $m^2/g$ and average particle size 2. 8 μm (FINESIL CM-F, TOKUYAMA SODA K.K.), 40 parts light calcium carbonate (TAMA PEARL 121, OKUTAMA KOGYO K.K.) and 20 parts colloidal silica (SNOWTEX N, NISSAN KAGAKU K.K.) as pigments, 30 parts styrene-butadiene latex (JSR-0801, NIIION GOSEI GOMU K.K.) and 30 parts casein (lactic casein, product of New Zealand) as binders, and 2 parts calcium stearate (NOPCOAT C-104, SUN NOPCO K.K.) as a mold release agent, were blended together to give a coating composition of a 40% solids content.

The coating composition thus obtained was applied by means of a roller coater to form a coating containing 20 $g/m^2$ of solids on paper having a basis weight of 90 $g/m^2$ The coated paper obtained was then treated with a 10% aqueous solution of calcium formate as a coagulant, and an aqueous solution containing 3% of a polyethyleneimine quaternary ammonium salt, which is a cationic polyelectrolyte, as a waterproofing agent.

Next, the mirror surface of a cast drum heated to 100° C. was brought into pressure contact with the coated surface while the coating on the paper was still wet, and the coating was dried so as to obtain an ink jet recording paper according to this invention.

The same tests as in Example 1 were carried out in order to evaluate the recording paper obtained. Table 2 shows the results.

EXAMPLE 3

An ink jet recording paper according to this invention was prepared exactly as described in Example excepting that 80 instead of 60 parts of the calcium carbonate-compounded silica of specific surface area 80 $m^2/g$ and average particle size 2.8 μm (FINESIL CM-F, TOKUYAMA SODA K.K.), and 20 instead of 40 parts of light calcium carbonate (TAMA PEARL 121, OKUTAMA KOGYO K.K.), were used. The same tests as in Example 1 were carried out in order to evaluate the recording paper obtained. Table 2 shows the results.

EXAMPLE 4

80 parts of a calcium carbonate-compounded silica of specific surface area 80 $m^2/g$ and average particle size 8

μm (FINESIL CM-F, TOKUYAMA SODA K.K.), 20 parts generally used amorphous synthetic silica of specific surface area 270 $m^2/g$ and average particle diameter 2.8 μm (FINESIL X-37B, TOKUYAMA SODA K.K.) and 20 parts colloidal silica (SNOWTEX N, NISSAN KAGAKU K.K.) as pigments, 30 parts styrene-butadiene latex (JSR-0801, NIHON GOSEI GOMU K.K.) and 30 parts casein (lactic casein, product of New Zealand) as binders, and 2 parts calcium stearate (NOPCOAT C-104, SUN NOPCO K.K.) as a mold release agent, were blended together to give a coating composition of a 28% solids content.

The coating composition thus obtained was applied by means of a roller coater to form a coating containing 17 $g/m^2$ solids on paper having a basis weight of 90 $g/m^2$. The coated paper was then treated with a 10% aqueous solution of calcium formate as a coagulant, and an aqueous solution containing 3% of a polyethyleneimine quaternary ammonium salt, which is a cationic polyelectrolyte, as a waterproofing agent.

Next, the mirror surface of a cast drum heated to 100° C. was brought into pressure contact with the coated surface while the coating on the paper was still wet, and the coating was dried so as to obtain an ink 4et recording paper according to this invention.

The same tests as in Example 1 were carried out in order to evaluate the recording paper obtained. Table 2 shows the results.

EXAMPLE 5

An ink jet recording paper according to this invention was prepared exactly as described in Example 4 excepting that 60 instead of 80 parts of the calcium carbonate-compounded silica of specific surface area 80 $m^2/g$ and average particle size 2.8 μm (FILNESIL CM-F, TOKUYAMA SODA K.K.), and 40 instead of 20 parts of generally used amorphous silica of specific surface area 270 $m^2/g$ and average particle diameter 2.8 μm (FINESIL X-37B, TOKUYAMA SODA K.K.), were used. The same tests as in Example 1 were carried out in order to evaluate the recording paper obtained. Table 2 shows the results.

EXAMPLE 6

60 parts of a calcium carbonate-compounded silica of specific surface area 80 $m^2/g$ and average particle size 2.8 μm (FINESIL CM-F, TOKUYAMA SODA K.K.), 40 parts generally used amorphous synthetic silica of specific surface 40 $m^2/g$ and average particle diameter 1.8 μm (FINESIL SP-20, TOKUYAMA SODA K.K.) and 20 parts colloidal silica (SNOWTEX N, NISSAN KAGAKU K.K.) as pigments, 30 parts styrene-butadiene latex (JSR-0617, NIHON GOSEI GOMU K.K.) and 30 parts casein (lactic casein, product of New Zealand) as binders, and 2 parts calcium stearate (NOPCOAT C-104, SUN NOPCO K.K.) as a mold release agent, were blended together to give a coating composition of a 30% solids content.

The coating solution thus obtained was applied by means of a roller coater to form a coating containing 17 $g/m^2$ solids on paper having a basis weight of 90 $g/m^2$. The coated paper obtained was then treated with a 10% aqueous solution of calcium formate as a coagulant, and an aqueous solution containing 3% of a polyethyleneimine quaternary ammonium salt which is a cationic polyelectrolyte as a waterproofing agent.

Next, the mirror surface of a cast drum heated to 100° C. was brought into pressure contact with the coated surface while the coating on the paper was still wet, and the coating was dried so as to obtain an ink jet recording paper according to this invention.

The same tests as in Example 1 were carried out in order to evaluate the recording paper obtained. Table 2 shows the results.

EXAMPLE 7

60 parts of a calcium carbonate-compounded silica of specific surface area 80 $m^2/g$ and average particle size 2. 8 μm (FINESIL CM-F, TOKUYAMA SODA K.K.), 40 parts kaolin (UW-90, ENGELIIARd M&C) and 20 parts colloidal silica (SNOWTEX N, NISSAN KAGAKU K.K.) as pigments, 24 parts styrene-butadiene latex (J,-DR-0617, NIIION GOSEI GOMU K.K.) and 24 parts casein (lactic casein, product of New Zealand) as binders, and 2 parts calcium stearate (NOPCOAT C-104, SUN NOPCO K.K.) as a mold release agent, were blended together to give a coating composition of a 40% solids content.

The coating composition thus obtained was applied by means of a roller coater to form a coating containing 20 $g/m^2$ solids on paper having a basis weight of 90 $g/m^2$. The coated paper obtained was then treated with a 10% aqueous solution of calcium formate as a coagulant, and an aqueous solution containing 3% of a polyethyleneimine quaternary ammonium salt which is a cationic polymer electrolyte as a waterproofing agent.

Next, the mirror surface of a cast drum heated to 100° C. was brought into pressure contact with the coated surface while the coating on the basal paper was still wet, and the coating was dried so as to obtain an ink jet recording paper according to this invention.

The same tests as in Example 1 were carried out in order to evaluate the recording paper obtained. Table 2 shows the results.

EXAMPLES 8, 9, 10, 11 AND 12

An ink jet recording paper according to this invention was prepared exactly as described in Example 1 excepting that 100 parts of each calcium carbonate-compounded silica set forth in the table below (FINESIL CM-F, TOKUYAMA SODA K.K.) was used as a pigment instead of 100 parts of the calcium carbonate-compounded silica of specific surface area 60 $m^2/g$ and average particle size 2.8 μm (FINESIL CM-E, TOKUYANIA SODA K.K.).

The same tests as in Example 1 were carried out in order to evaluate the recording paper obtained. Table 2 shows the results.

TABLE 1

| Example | Average particle diameter (μm) | Specific surface area ($m^2/g$) |
|---|---|---|
| Example 8 | 2.8 | 80 |
| Example 9 | 3.9 | 80 |
| Example 10 | 6.7 | 80 |
| Example 11 | 2.8 | 100 |
| Example 12 | 2.8 | 120 |

COMPARATIVE EXAMPLE 1

An ink jet recording paper was prepared in the same manner as in Example 1 excepting that 100 parts of generally used amorphous synthetic silica of specific surface area 270 $m^2/g$ and average particle diameter 2.8 μm (FINESIL X-37B, TOKUYAMA SODA K.K.) was used as a pigment instead of 100 parts of the calcium carbonate-compounded silica of specific surface area 60 $m^2/g$ and average particle size 2.8 μm (FINESIL CM-F, TOKUYAMA SODA K.K.).

The same tests as in Example 1 were carried out in order to evaluate the recording paper obtained. Table 2 shows the results.

COMPARATIVE EXAMPLE 2

An ink jet recording paper was prepared in the same manner as in Example 1 excepting that 100 parts of generally used amorphous synthetic silica of specific surface area 40 $m^2/g$ and average particle diameter 1.8 μm (FINESIL SP-20, TOKUYAMA SODA K.K.) was used as a pigment instead of 100 parts of the calcium carbonate-compounded silica of specific surface area 60 $m^2/g$ and average particle size 2.8 μm (FINESIL CM-F, TOKUYAMA SODA K.K.).

The same tests as in Example 1 were carried out in order to evaluate the recording paper obtained. Table 2 shows the results.

COMPARATIVE EXAMPLE 3

An ink jet recording paper was prepared in the same manner as in Example 2 excepting that generally used amorphous synthetic silica of specific surface area 270 $m^2/g$ and average particle diameter 2.8 μm (FINESIL X- 37B, TOKUYAMA SODA K.K.) was used instead of the calcium carbonate-compounded silica of specific surface area 80 $m^2/g$ and average particle size 2.8 μm (FINESIL CM-F, TOKUYAMA SODA K.K.).

The same tests as in Example 1 were carried out in order to evaluate the recording paper obtained. Table 2 shows the results.

COMPARATIVE EXAMPLE 4

An ink jet recording paper was prepared in the same manner as in Example 2 excepting that 40 instead of 60 parts of the calcium carbonate-compounded silica of specific surface area 80 $m^2/g$ and average particle diameter 2.8 μm (FINESIL CM-F, TOKUYAMA SODA K.K.), and 60 instead of 40 parts of light calcium carbonate (TAMA PEARL 121, OKUTAMA KOGYO K.K.), were used.

The same tests as in Example 1 were carried out in order to evaluate the recording paper obtained. Table 2 shows the results.

COMPARATIVE EXAMPLE 5

An ink jet recording paper was prepared in the same manner as in Example 3 excepting that 40 instead of 80 parts of the calcium carbonate-compounded silica of specific surface area 80 $m^2/g$ and average particle diameter 2.8 μm (FINESIL CM-F, TOKUYAMA SODA K.K.), and 60 instead of 20 parts of generally used amorphous synthetic silica (FINESIL X-37B, TOKUYAMA SODA K.K.), were used.

The same tests as in Example 1 were carried out in order to evaluate the recording paper obtained. Table 2 shows the results.

REFERENCE EXAMPLE 1

The same tests as in Example 1 were carried out in order to evaluate a commercial ink jet recording paper. Table 2 shows the results.

The aforesaid recording paper was the paper recommended for use with the full color ink jet printer with which printing tests were performed.

TABLE 2

| Example | 75° mirror gloss | Ink absorptn. | Dot density | Dot diameter μm | Roundness coeff. | Sharpness |
|---|---|---|---|---|---|---|
| Example 1 | 68.1 | ⊚ | 0.96 | 68.3 | 0.73 | ○ |
| Example 2 | 71.5 | ○ | 0.78 | 62.5 | 0.70 | ○ |
| Example 3 | 69.6 | ⊚ | 0.86 | 67.2 | 0.70 | ○ |
| Example 4 | 70.1 | ⊚ | 0.88 | 63.8 | 0.76 | ○ |
| Example 5 | 69.2 | ⊚ | 0.83 | 63.5 | 0.74 | ○ |
| Example 6 | 75.8 | ⊚ | 0.85 | 69.5 | 0.68 | ○ |
| Example 7 | 92.7 | ○ | 0.89 | 61.2 | 0.78 | ○ |
| Example 8 | 77.8 | ⊚ | 0.87 | 68.1 | 0.71 | ○ |
| Example 9 | 82.9 | ⊚ | 0.83 | 67.9 | 0.71 | ○ |
| Example 10 | 82.1 | ⊚ | 0.76 | 68.0 | 0.69 | ○ |
| Example 11 | 79.0 | ⊚ | 0.83 | 65.5 | 0.75 | ○ |
| Example 12 | 81.5 | ⊚ | 0.78 | 65.0 | 0.75 | ○ |
| Comparative Example 1 | 82.7 | ⊚ | 0.80 | 58.7 | 0.48 | Δ |
| Comparative Example 2 | 59.8 | ○ | 0.84 | 71.2 | 0.56 | Δ |
| Comparative Example 3 | 78.2 | Δ | 0.73 | 59.2 | 0.55 | X |
| Comparative Example 4 | 72.0 | Δ | 0.68 | 61.9 | 0.59 | X |
| Comparative Example 5 | 71.0 | ⊚ | 0.78 | 62.0 | 0.61 | Δ |
| Ref. Example | 2.0 | ⊚ | 0.85 | 65.1 | 0.49 | Δ |

From the above results, it was confirmed that the ink jet recording paper according to this invention provides recordings with a 75° mirror surface gloss, satisfactory smoothness and ink absorption, high dot sharpness and dot roundness, and high dot density.

What is claimed is:

1. A method of using calcium carbonate-compounded silica to provide ink jet recording paper which comprises cast coating a pigment-containing coating composition and cationic polymer onto at least one surface of paper, said pigment-containing coating composition comprising synthetic silica pigment and calcium carbonate compounded silica pigment, wherein at least 50 weight percent of the pigment is calcium carbonate-compounded silica.

2. A method as in claim 1, wherein cast coating the pigment-containing composition and cationic polymer onto at least one surface of paper comprises applying the pigment-containing coating composition onto paper to form a coating, coagulating the coating, applying a cationic polymer to the coating, and drying the coating.

3. A method as in claim 2, wherein the pigment-containing coating composition contains a binder.

4. A method as in claim 1, wherein the content of said calcium carbonate-compounded silica in the pigment is at least 80 weight percent.

5. A method as in claim 1, wherein said calcium carbonate-compounded silica contains calcium carbonate in a proportion of 15-25 mol % based on CaO.

6. A method as in claim 1, wherein the average particle size of said calcium carbonate-compounded silica is no greater than 4 μm.

7. A method as in claim 6, wherein said calcium carbonate-compounded silica has a specific surface area of no greater than 100 $m^2/g$ when determined by the BET method.

8. A method as in claim 1, wherein the average particle size of said calcium carbonate-compounded silica is no greater than 3 μm.

9. A method as in claim 1, wherein said calcium carbonate-compounded silica has a specific surface area of no greater than 100 $m^2/g$ when determined by the BET method.

10. A method as in claim 9, wherein said calcium carbonate-compounded silica has a specific surface area of no greater than 80 $m^2/g$ when determined by the BET method.

11. A method as in claim 1, wherein said pigment-containing coating composition contains a binder in an amount of 20-80 parts by weight per 100 parts by weight of said pigment.

12. A method as in claim 1, wherein the coverage of said coating on each surface of the support is 5-50 $g/m^2$ on a solids basis.

13. A method as in claim 12, wherein the coverage of said coating on one surface of the support is 10-30 $g/m^2$ on a solids basis.

14. A method as in claim 1, wherein the coverage of said pigment is 3-30 $g/m^2$.

* * * * *